Sept. 23, 1952  A. R. OLSON ET AL  2,611,757
CUTTING PAD
Filed May 29, 1948

*Inventors*
Arthur R. Olson
Edmund W. Gelewitz
By their Attorney

Patented Sept. 23, 1952

2,611,757

UNITED STATES PATENT OFFICE 2,611,757

CUTTING PAD

Arthur R. Olson, Wakefield, Mass., and Edmund W. Gelewitz, Evanston, Ill., assignors to United Shoe Machinery Corporation, Flemington, N. J., a corporation of New Jersey Application May 29, 1948, Serial No. 30,106

1 Claim. (Cl. 260—38)

This invention relates to cutting pads and particularly to a cutting pad for a dieing-out machine such as a clicker for use in cutting leather.

Surfaces against which cutting of sheet material is to be done must be sufficiently hard to support the material being cut so that the cutting edge will pass through the sheet material to be cut without bending the material or forcing it appreciably into the surface which is being cut against. On the other hand, to effect a clean severance of the fibers of the material being cut, it is usually desirable, particularly with cutting dies, that the cutting edge penetrate to a limited extent the surface being cut against. Also, and particularly in cutting surfaces for use with dieing-out machines of the character of clickers, the cutting pad must be able to withstand the severe shock to which it is subjected during the cutting cycle.

Blocks of maple wood, preferably with the grain on end, have been extensively used to provide a cutting surface for clickers. A serious shortage of maple wood suitable for this use has developed. Numerous materials, such as nylon and cellulose acetate which have hardness characteristics such that they give a satisfactory cutting action, have been tried; but although these materials are initially satisfactory, the surface deteriorates rapidly on use, with the breaking out of small pieces of material from the surface.

It is a feature of the present invention to provide a clean-cutting and exceptionally wear-resistant cutting pad possessing the hardness and resistance to breaking under shock fitting it for use in cutting operations.

Applicants have provided a new cutting pad of a material possessing the hardness, strength, and resistance to breakage to give clean-cutting operation in a dieing-out machine and possessing the unusual property that, when the material is cut, the cut surfaces will bond together under the pressure of the slow recovery of the body of material at the sides of the cut and by the action of adjacent cuts in displacing the material adjacent the original cut. The new cutting surface comprises the product of reacting under heat and pressure a butadiene-acrylonitrile copolymer containing at least 20% acrylonitrile and a synthetic resinous reaction product of cashew nutshell oil and another phenol with sufficient aldehyde to make said resinous product thermosetting. It is important that the butadiene-acrylonitrile copolymer and the resinous material be present within certain ranges of relative proportions in order to give to the composition the novel property of bonding together at cut surfaces thereof and to provide the physical characteristics necessary to give a good cutting action.

It is to be observed that the cutting pad composition, as above described, does not include sulphur. Sulphur is believed to react with the residual unsaturation of the acrylonitrile content during vulcanization of butadiene-acrylonitrile copolymer rubbers. This effect is believed to destroy in some measure the ability of cutting surfaces to bond with each other. Since the butadiene-acrylonitrile copolymer in the cutting pad composition retains residual unsaturation, i. e., is not brought to the vulcanized state by reaction with sulphur, the present cutting pad possesses a remarkable ability to heal after cutting.

A filler may be employed in the cutting pad composition provided the proportion of filler is maintained below the value which would interfere with the self-bonding properties of the composition.

The extraordinary action of the new cutting pad in bonding together the surfaces of cuts formed therein is illustrated in the attached drawings, in which Fig. 1 is a perspective view of one type of cutting pad according to the present invention;

Figure 1:
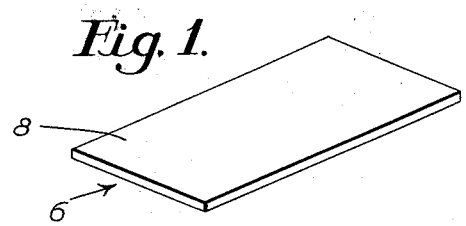

A cutting pad 6 (see Fig. 1) according to the instant invention is a body, having smooth surfaces for cutting, of a composition which may comprise 100 parts by weight of a butadiene-acrylonitrile copolymer containing at least 20% of acrylonitrile, and from 80 to 105 parts by weight of a synthetic resinous reaction product of cashew nut shell oil and another phenol with sufficient aldehyde to make the resinous product thermosetting. Optionally there may be included up to about 23 parts by volume of a mineral filler based on 100 parts by volume of the butadiene-acrylonitrile copolymer.

Among the butadiene-acrylonitrile copolymer materials which have been found particularly satisfactory are the products known as Hycar OR-25 which is understood to contain about 33% of acrylonitrile and which is produced by the B. F. Goodrich Company of Akron, Ohio, and Perbunan 35, a product of the Standard Oil Company of New Jersey, which is understood to have about the same percentage of acrylonitrile. Other copolymers which may be used are Hycar OR-15 which contains about 45% of acrylonitrile and which is produced by the B. F. Goodrich Company, Chemigum N3 and N4, produced by the Goodyear Tire and Rubber Company of Akron, Ohio, and Butaprenes NXM and NL produced by the Firestone Tire and Rubber Company of Akron, Ohio. The exact acrylonitrile contents of the Chemigums and Butaprenes are not known but are understood to be above 20%. Other butadiene-acrylonitrile copolymers may be used provided that they contain a sufficient percentage of nitrile for reaction with the phenolic resin employed.

The phenolic resins employed are the thermosetting reaction products of cashew nutshell oil and another phenol with an aldehyde. The method of manufacture and properties of this type of resin are disclosed in United States Letters Patent No. 2,203,206, granted June 4, 1940, upon an application of Alvin F. Shepard. Among the resins which have been found satisfactory for use in the present cutting pad composition are the Durez resins 12687, 13716 and 12707 which are produced by the Durez Plastics and Chemicals, Inc., of North Tonawanda, New York.

Any of the conventional mineral fillers used in compounding of butadiene-acrylonitrile copolymer compositions may be used. Among the most satisfactory which have been tried are the material known as Kalvan, which comprises calcium carbonate of ultra-fine particle size together with a small proportion of a stearate soap, the composition having a specific gravity of 2.75 and being produced by the R. T. Vanderbilt Company; a channel black material known as Spheron #9, an easy processing channel black obtained from the Godfrey L. Cabot Company, Inc., of Boston, Massachusetts; and a material known as Calcene comprising precipitated calcium carbonate of extremely fine particle size and a soap, obtained from the Columbia Chemicals Division of the Pittsburgh Plate Glass Company.

Conventional antioxidant materials such as phenyl-beta-naphthylamine are preferably incorporated for their usual purposes.

The cutting pad composition is manufactured by conventional manufacturing procedures. A satisfactory method involves mixing the resin with the butadiene-acrylonitrile in a Banbury Mixer at a temperature above the melting point of the resin but below its active curing range. With the Durez resins 12687, 13716 and 12707, it has been found that a mixing temperature of from 150° to 200° F. is satisfactory for easy mixing.

When the components have been thoroughly mixed, the material may be sheeted out, pressed in a mold and subjected to heat and pressure sufficient to effect curing. A pressure of at least about 800 pounds per square inch at a temperature of about 310° F., and curing time of at least 20 minutes and up to as much as 45 minutes have been found satisfactory. The preferred curing time is about 25 minutes.

In addition to the above-referred-to property of bonding of cut surfaces of the material, a cutting pad according to the present invention should have the following physical characteristics, as determined by ASTM tests, in order to function most effectively as a cutting pad for a clicker:

Hardness—Shore D__ 60–80.
Tensile strength_____ At least 2500 pounds per square inch.
Elongation_____ 5% to 50%.
Shear strength_____ At least 800 pounds per square inch.
Impact strength (Izod At least 3 foot pounds.
  unnotched).
Rockwell "M" hardness. —30 to 30.

Cutting pad compositions within the above-identified ranges of relative proportions and possessing the above-listed physical properties give extremely long wear and great resistance to deterioration. Compositions containing a proportion of phenolic resin below the ranges given above result in a surface on which cutting will be uneven or ragged, while compositions containing a greater percentage of phenolic resin give a surface which will deteriorate rapidly through chipping or crumbling during cutting. The percentage of filler is not as important as the percentage of resinous material and satisfactory cutting blocks have been made containing no filler and containing as high as 23 parts by volume of the filler to 100 parts by volume of butadiene-acrylonitrile copolymer rubber. In compounding to obtain the most satisfactory cutting surface, it has been found that as the percentage of filler is increased, the proportion of phenolic resin to the butadiene-acrylonitrile copolymer should be decreased to avoid brittleness. However, within the ranges of filler content given, highly satisfactory cutting surfaces may be obtained.

Notwithstanding the advantage obtained in compositions containing no sulphur, cutting pads having somewhat reduced self-healing properties, useful for some purposes, have been prepared containing as high as 15 parts of sulphur with 100 parts of butadiene-acrylonitrile copolymer.

The following examples are given to aid in understanding the invention and it is to be understood that the invention is not limited to the specific proportions or ingredients employed in the examples.

*Example I*

One hundred parts by weight of a butadiene-acrylonitrile copolymer rubber containing 33% of acrylonitrile (Hycar OR-25) was combined with 95 parts by weight of a synthetic resinous reaction product of cashew nutshell oil and another phenol with sufficient aldehyde (8% by weight of the resin of hexamethylaminetetramine) to make said resinous product thermosetting, 15 parts by weight (8.6 parts by volume to 100 parts by volume of the copolymer rubber) of channel black (Spheron #9) and one part by weight of phenyl-beta-naphthylamine (Neozone), were mixed in a Banbury mixer of which the temperature was maintained at from 150° to 200° F. When the mixing had been completed, the material was sheeted out and placed in a mold 18"x36"x1" and cured under 1400 lbs. pressure per square inch for 25 minutes at a temperature of about 310° F.

The resulting cutting pad had a hardness (Shore D) of 66, a tensile strength of 3390 pounds per square inch, an elongation of 45%, a shear strength of 960 pounds per square inch, an impact strength of 3.7 foot pounds and a Rockwell "M" hardness of +19.

The cutting pad thus obtained gave an excellent cutting action in a clicker and was still functioning satisfactorily after seven months of normal use as a cutting pad for a clicker in cutting room operation.

Figure 3:
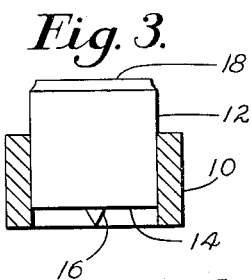
Fig. 3 is an elevation partly in section of the punch apparatus used in forming the indentations in the surface of the cutting pad.

The following tests were carried out on a section of a cutting pad 6 of the above composition: A punch apparatus (see Fig. 3) comprising a guide sleeve 10 and a cylinder 12 slidably mounted in the sleeve 10 and having in the center of one end face 14 a penetrating cone 16 having a base of .125 inch and a height of .125 inch was placed on a surface 8 of the cutting pad with the point of the cone resting on the surface of the pad. The cone was driven into the pad to its full extent by a sharp blow with a hammer on the upper face 18 of the cylinder 12. The cylinder and cone were lifted from the sleeve, the sleeve moved $\frac{1}{32}''$, the cylinder reinserted in the sleeve and the cone driven into the cutting pad a second time.

Figure 2:
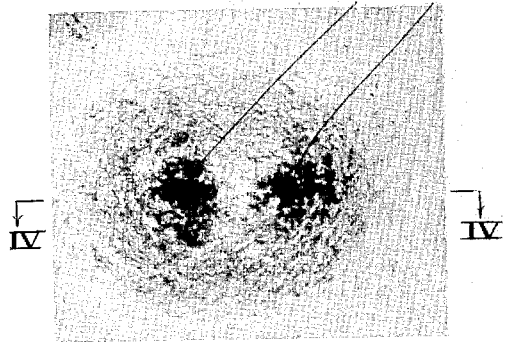
Fig. 2 is a photomicrograph of a surface of the cutting pad in which successive closely adjacent indentations have been formed.
Figure 4:
Fig. 4 is a photomicrograph of a cross section taken on the lines IV—IV of Fig. 2 showing the bonding together of the edges of a first indentation by the action of an adjacent second indentation.

As shown in Fig. 2, which is a photomicrograph at 15.4 diameters with diffuse, nondirectional fluorescent lighting, and in Fig. 4, which is a photomicrograph at 15.0 diameters taken with oblique lighting using an incandescent lamp, of a cross section on line IV—IV of Fig. 2, through the indentations in the cutting pad, the first indentation 20 has been substantially filled by material displaced in making the second indentation 22 and the displaced material has bonded uniformly with other portions of the material so that there is no visible joint or line of separation where the surfaces of the first indentation 20 were brought together by displacement of material in making the second indentation 22.

Figure 5:
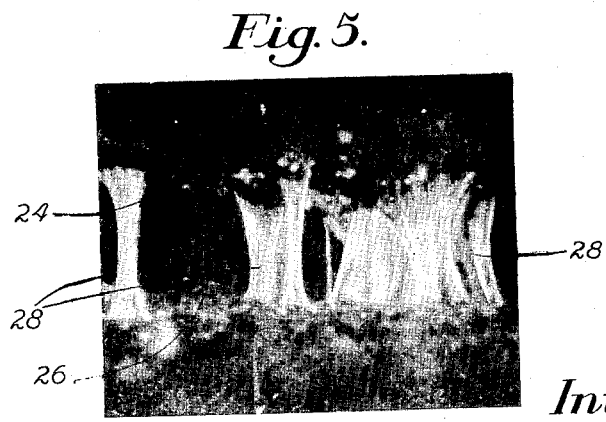
Fig. 5 is a photomicrograph showing the bond formed between cut surfaces of the cutting pad composition.

To further show the bonding characteristic possessed by the cutting pad composition, two freshly cut surfaces 24 and 26 of the cutting pad composition were brought together and pressed together under 2000 pounds per square inch for a period of 2 hours. The surfaces were found to have adhered tightly together. When the surfaces were wedged slightly apart by the insertion of a knife edge (see Fig. 5 which is a photomicrograph taken at 66 diameters with oblique incandescent lighting) "legs" 28, that is, filaments or threads of the composition, extended from one cut surface to the other cut surface clearly demonstrating that a firm bond had been formed between the surfaces.

*Example II*

40 parts by weight of a butadiene-acrylonitrile copolymer rubber (Hycar OR-25) was combined with 47 parts by weight of a synthetic resinous reaction product, cashew nutshell oil and another phenol together with sufficient aldehyde (8% by weight of the resin of hexamethylaminetetramine) to make said resinous product thermosetting, 2 parts by weight of zinc oxide, 4 parts by weight of sulphur, 0.8 part by weight of stearic acid, 0.8 part by weight of Altax (benzothiazyl disulfide), 3.8 parts by weight of dibutyl sebacate, and 1.7 parts by weight of a channel black were mixed in a Banbury at a temperature rising from an initial temperature of 80° F. to a final temperature of 150° F. The mixture was sheeted out, dusted with talc and disposed in a mold 18"x36"x1". The mixture was cured for 30 minutes at a temperature of about 310° F. under a pressure of 1000 pounds per square inch. The molded pad was removed. The pad had a Shore-D hardness of 68, a tensile strength of 3530 pounds per square inch, an elongation of 25%, a shear strength of 1130 pounds per square inch, a notched Izod impact strength of 3.2 foot pounds, and a Rockwell "M" hardness of 18. The cutting pad thus obtained gives a quite satisfactory cutting action in a clicker.

Having thus described our invention, what we claim as new and desire to secure by Letters Patent of the United States is:

A clean cutting, wear resistant cutting pad comprising a smooth surfaced body of material of which cutting surfaces will bond when pressed together, said material comprising the product of molding under sufficient heat and pressure to effect curing a mixture of 100 parts by weight of a rubbery butadiene-acrylonitrile copolymer containing at least 20% acrylonitrile, about 95 parts by weight of a synthetic resinous reaction product of cashew nutshell oil and another phenol, sufficient aldehyde to make said resinous product thermosetting and channel black in the proportion of 8.6 parts by volume to 100 parts by volume of the butadiene-acrylonitrile copolymer, said cutting pad having a Shore-D hardness of 60 to 80, a tensile strength of at least 2500 pounds per square inch, an elongation of from 5% to 50%, a shear strength of at least 800 pounds per square inch, a notched Izod impact strength of at least three foot pounds and a Rockwell "M" hardness of from −30 to 30.

ARTHUR R. OLSON.
EDMUND W. GELEWITZ.

REFERENCES CITED

The following references are of record in the file of this patent:

UNITED STATES PATENTS

| Number | Name | Date |
|---|---|---|
| 2,203,206 | Shepard et al. | June 4, 1940 |
| 2,281,877 | Green | May 5, 1942 |
| 2,325,620 | Maeser | Aug. 3, 1943 |
| 2,532,374 | Shepard | Dec. 5, 1950 |

OTHER REFERENCES

Shepard et al., Modern Plastics, October 1946, pages 154–156, 210 and 212.

Searer, Rubber Age, November 1947, pages 191–193.

Newberg et al., Rubber Age, February 1948, pages 533–539.